United States Patent [19]

Rosaen et al.

[11] 4,387,022
[45] Jun. 7, 1983

[54] FLUID FILTERING DEVICE

[76] Inventors: Borje O. Rosaen, 4031 Thornoaks Dr., Ann Arbor, Mich. 48104; Dale P. Fosdick, 7000 Austin Rd., Saline, Mich. 48176

[21] Appl. No.: 275,250

[22] Filed: Jun. 19, 1981

[51] Int. Cl.³ .......................................... B01D 27/10
[52] U.S. Cl. .................................. 210/132; 210/238; 210/416.5; 210/DIG. 14
[58] Field of Search ....... 210/132, 133, 168, DIG. 14, 210/232, 234, 238, 416.5, 435, 441, 445, 470

[56] References Cited

U.S. PATENT DOCUMENTS

| | | | |
|---|---|---|---|
| 3,374,892 | 3/1968 | Samalon | 210/132 |
| 3,722,683 | 3/1973 | Shaltis et al. | 210/132 |
| 3,883,430 | 5/1975 | Codo | 210/132 |
| 4,167,483 | 9/1979 | Rosaen et al. | 210/DIG. 14 |

Primary Examiner—Thomas G. Wyse
Attorney, Agent, or Firm—Gifford, VanOphem, Sheridan & Sprinkle

[57] ABSTRACT

A fluid filtering device is provided for use with a fluid system having a fluid reservoir at least partially filled with fluid. The filter device comprises a housing which is submerged within the reservoir and has a fluid port. An elongated filter assembly comprising a tubular filter element open at one end and a holder assembly secured to the other end of the filter element is insertable into the reservoir so that the open end of the filter element sealingly engages the submerged housing. A fluid passage through the housing fluidly connects the fluid port with the interior of the filter element. A stopper is formed on the free end of the holder assembly so that the entire filter assembly can be inverted and reinserted into the reservoir whereupon the stopper prevents fluid flow through the fluid passage permitting the servicing of other system downstream of the filter assembly without it being necessary to drain the reservoir.

12 Claims, 7 Drawing Figures

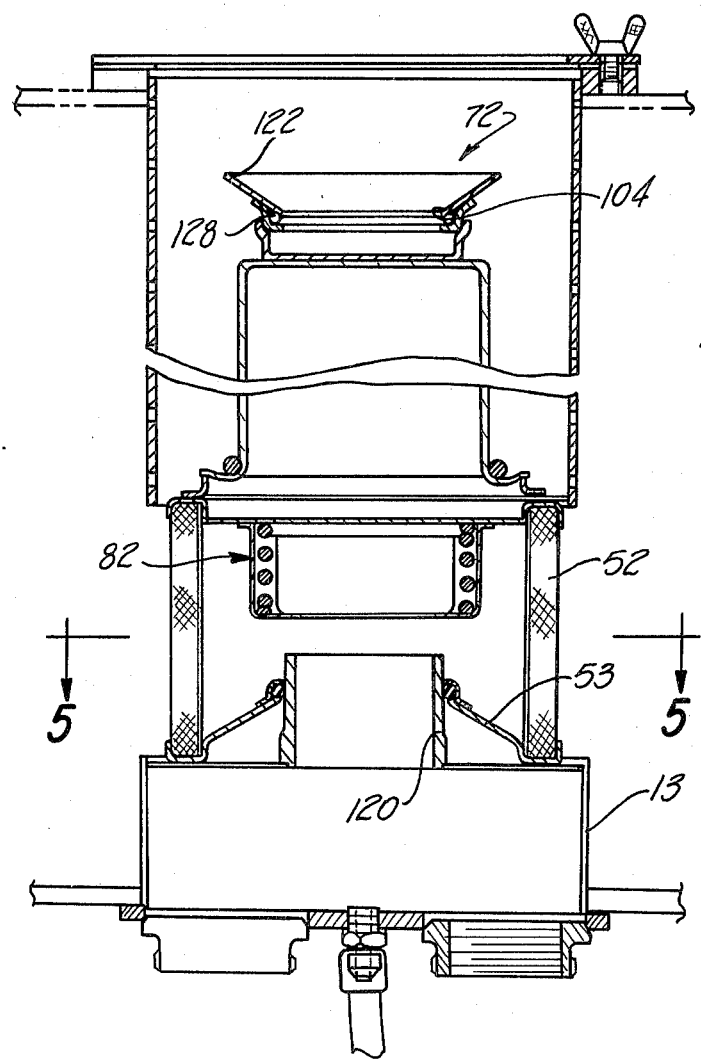
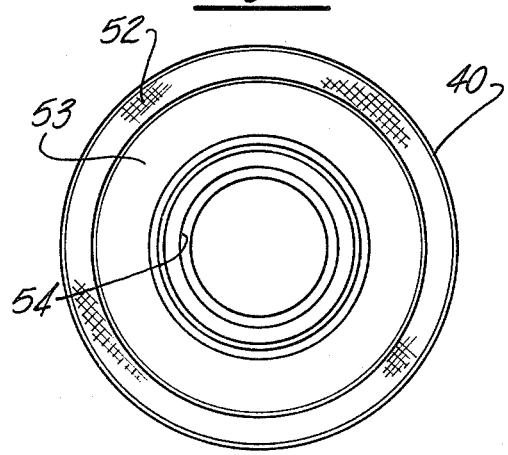
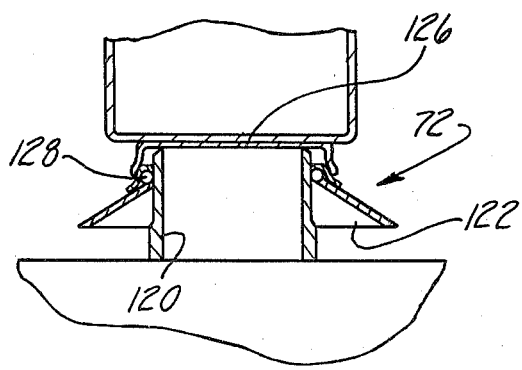

FLUID FILTERING DEVICE

BACKGROUND OF THE INVENTION

I. Field of the Invention

The present invention relates generally to fluid filtering devices and, more particularly, to a fluid filtering device adapted to be submerged in a fluid reservoir.

II Description of the Prior Art

Hydraulic fluid systems conventionally include a reservoir of hydraulic fluid, a suction line for fluidly connecting the reservoir to a hyraulic pump, and a fluid return line from the hydraulic system and to the reservoir. The hydraulic fluid within the system becomes contaminated during the operation of the system and these contaminants must be filtered from the fluid in order to prevent damage to the pump and the other components of the fluid system. There have been a number of previously known fluid filter devices which are fluidly connected to either the suction line from the reservoir or the return line to the reservoir to remove such contaminants.

A number of the previously known suction line filter devices include a housing which is submerged within the fluid reservoir and which has an fluid outlet port which is connected to the suction line of a hydraulic pump. A filter assembly including a tubular filter element is insertable into the reservoir and to a filtering position in which both axial ends of the filter element sealingly engage the housing. Simultaneously, one side of the filter element is open to the fluid in the reservoir while the other side of the filter element is fluidly connected to the housing port. Thus, upon actuation of the pump, the fluid from the reservoir is drawn through the filter element to remove contaminants from the fluid and then flows to the hydraulic pump.

During the operation of the hydraulic system, the filter element becomes increasingly clogged with contaminants removed from the fluid thus creating a pressure drop across the filter element. When the filter element becomes excessively clogged it must be either replaced or cleaned in order to prevent pump cavitation and possible damage to the pump.

In suction systems and especially where the reservoir is located above the pump, it is very difficult to repair or replace the pump because there is no convenient way of shutting off fluid flow from the reservoir to the pump.

Some systems have in the past included shut-off valves to stop fluid flow through the filter device when the pump is repaired or replaced. These are expensive and require maintenance.

SUMMARY OF THE PRESENT INVENTION

The present invention provides a suction line filter for a hydraulic system or the like having a simple and inexpensive means for stopping fluid flow through the filter device during repair or replacement of the pump or other system components.

In brief, the present invention comprises a housing having at least a portion submerged within the fluid reservoir. The housing includes a fluid port which is connected to the suction line of a pump by any suitable conduit.

The filter device further comprises an elongated filter assembly having a tubular filter element open at at least one end and a holder assembly attached to the other end of the filter element. The filter assembly is insertable into the reservoir and against the housing whereupon the opening of the filter element is sealingly engaged with the submerged housing. Simultaneously, a fluid passage through the housing fluidly connects the housing port with the interior of the filter element while the exterior of the filter element is in fluid communication with the fluid in the reservoir. Consequently, upon actuation of the pump, fluid from the reservoir passes through the filter element, through the housing passageway and to the pump.

A stopper or plug member is attached to the upper or free end of the holder assembly. The stopper is dimensioned so that the entire filter assembly can be removed from the reservoir, inverted and reinserted into the reservoir and against the housing. Upon doing so, the stopper abuts against and fluidly closes the housing passageway thus stopping fluid flow through the filter device.

In the preferred form of the invention, the other axial end of the tubular filter element is also open and a wire mesh or other filter member is disposed across this other end of the filter element. In addition, a normally closed and pressure responsive bypass valve is contained within the interior of the filter element and has its inlet open to the wire mesh. When the pressure differential across the filter element exceeds a predetermined amount, indicative of excessive clogging of the filter element, the bypass valve opens and permits fluid to flow from the fluid reservoir, through the wire mesh and bypass valve, and to the pump. Consequently, even during a bypassing condition, some filtering of the fluid in the reservoir occurs.

In a modification of the present invention, a small air bleed conduit is disposed within the interior of the filter element and has its upper end open to the uppermost portion of the interior of the filter element. The lower end of the air bleed conduit is positioned within the housing passageway. Thus, any air which passes into the interior of the filter element during the operation of the fluid system is evacuated through the air bleed conduit due to the venturi action of the fluid passing through the housing passage.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 4 is a longitudinal sectional view similar to FIG. 1 but illustrating a further preferred embodiment;

FIG. 5 is a cross sectional view taken substantially along line 5—5 in FIG. 4;

FIG. 6 is a fragmentary sectional view of the embodiment of the invention shown in FIG. 4 but illustrating the device in a sealed, non-operating condition.

DETAILED DESCRIPTION OF PREFERRED EMBODIMENTS OF THE PRESENT INVENTION

Figure 1:
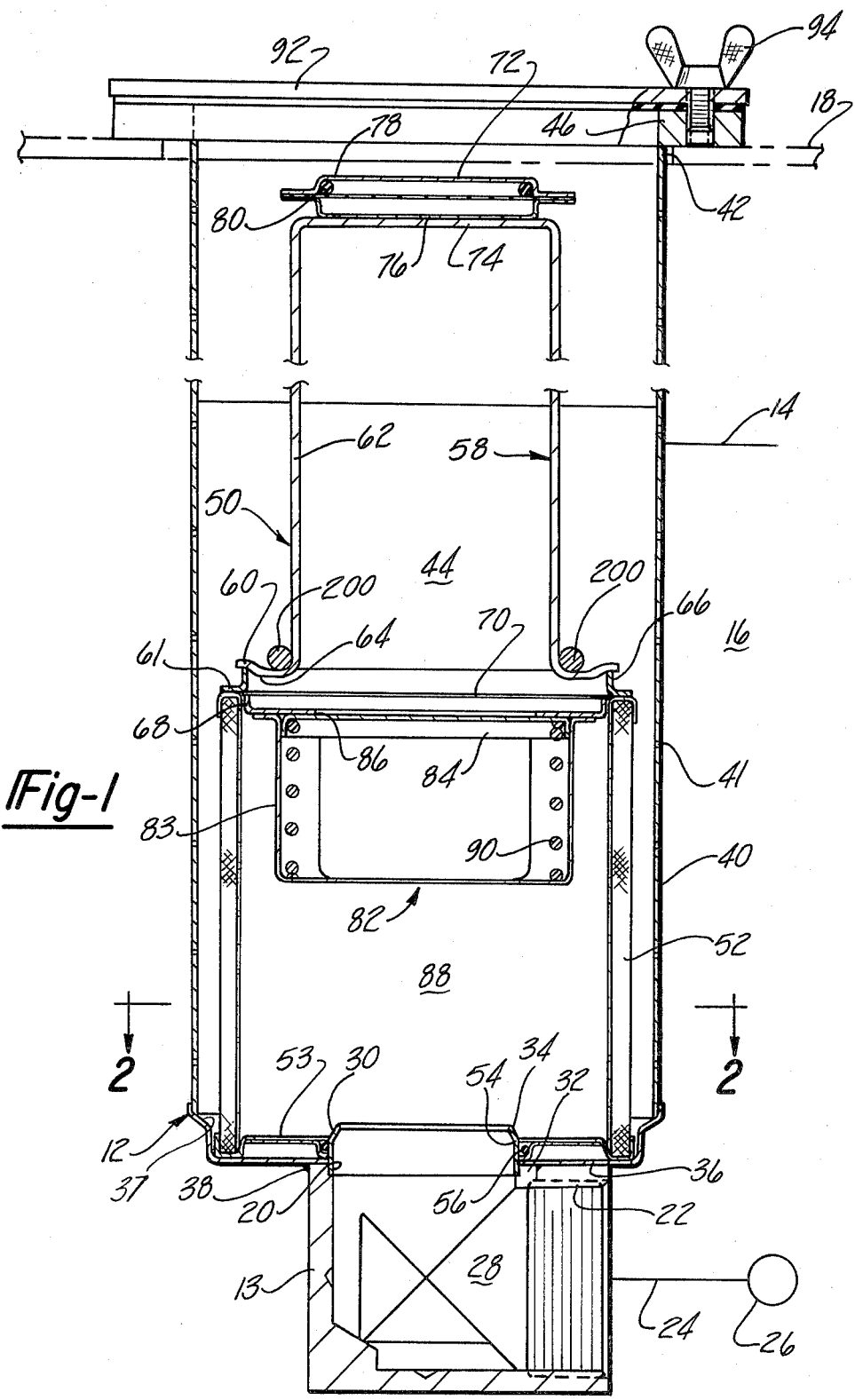
FIG. 1 is a longitudinal sectional view illustrating a preferred embodiment of the fluid filtering device of the present invention in a filtering configuration.
Figure 2:
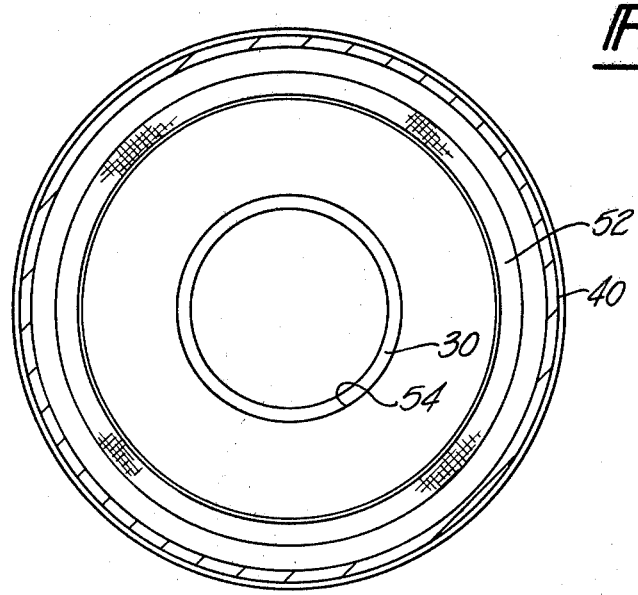
FIG. 2 is a cross sectional view taken substantially along line 2—2 in FIG. 1.

With reference first to FIGS. 1 and 2, a first preferred embodiment of a filtering device of the present invention is thereshown and comprises a housing 12 having a lower housing portion 13 which is submerged below the fluid level 14 of a fluid reservoir 16. The reservoir 16 has a reservoir housing 18 and is of the type used in hydraulic systems.

The housing portion 13 includes a circular opening 20 which faces upwardly and a circular fluid port 22 which is internally threaded for connection with a conventional fluid fitting (not shown). A fluid conduit 24 (illustrated only diagrammatically) fluidly connects the port 22 to the inlet of a pump 26. A generally L-shaped passageway 28 is also formed through the housing portion 13 and fluidly connects the port 22 to the opening 20.

An annular sleeve 30 is coaxially attached to the housing opening 20 so that a portion of the sleeve 30 protrudes upwardly and above the top 32 of the housing portion 13 for a reason to be subsequently described. The sleeve 30 is attached to the housing portion 13 in any conventional fashion such as by welding or by a press fit, and the uppermost portion 34 of the sleeve 30 tapers inwardly as shown in FIG. 1.

An outwardly extending annular flange 36 is attached by welds 38 to the upper end 32 of the housing portion 13. An elongated tubular and cylindrical tube 40 is secured at its lower end to the outer periphery of the annular flange 36 and, at its upper end 42, is attached to the reservoir housing 18. The tube 40 forms a generally cylindrical chamber 44 within the reservoir 16. A circular opening 46 in the reservoir housing 18 above the tube 40 provides access to the chamber 44. In addition, the tube 40 is constructed of perforated steel or otherwise has openings 41 formed through it to establish fluid communication between the fluid in the reservoir 16 and the chamber 44.

Still referring to FIGS. 1 and 2, the fluid filtering device of the present invention further comprises an elongated filter assembly 50. The filter assembly 50 includes a tubular and cylindrical filter element 52 having an annular and inwardly extending flange 53 secured to its lowermost end. The flange 53 has a central axial opening 54 in which a seal member 56, such as an O-ring, is mounted. The diameter of the flange opening 54 is substantially the same, or slightly larger, than the outside diameter of the housing sleeve 30.

Referring now to FIG. 1, the filter assembly 50 further includes an elongated holder member 58 which is secured at one end 60 to the upper end 61 of the filter element 52. The holder member 58 generally comprises an inverted U-shaped bracket 62 having free ends 64 engaged to contact an annular rim 66 and retaining pins 200. The bracket 62 is resilient and tends to urge the free ends 64 away from each other. To separate the holder member 58 from the filter member 52, the free ends 64 are pressed toward each other causing the ends 64 to separate first from the rim 66 and then from the pins 200.

The lower end of the rim 66 is attached to a flat and circular mounting plate 68 while a planar and circular filter member 70 is positioned and secured between the rim 66 and mounting plate 68. The filter member 70 is preferably a metal screen.

A stopper or plug member 72 is attached to the upper end of the base 74 of the U-shaped bracket 62 so that the stopper 72 is coaxial with the filter element 52. The stopper 72 is generally disk shaped and hollow and is closed at its lower end 76 as viewed in FIG. 1. A circular opening 78 is formed through the upper or free end of the stopper 72 while an O-ring or similar seal 80 is positioned inside the stopper 72. The stopper opening 78 is substantially the same or slightly larger in size as the outer diameter of the sleeve 30.

Still referring to FIG. 1, in the preferred form of the invention, a normally closed, pressure responsive bypass valve means 82 is attached to the mounting plate 68 on the top of the filter element 52. The bypass valve means 82 includes a valve housing 83 in which a disc shaped valve member 84 is axially slidably mounted. The valve member 84 is larger than and registers with an opening 86 in the plate 68 while a compression spring 90 contained within the valve housing 83 urges the valve member 84 against the plate 68 thus closing the opening 86.

In the well known fashion, when the pressure drop across the filter element 52 exceeds a predetermined amount, indicative of excessive clogging of the filter element 52, the bypass valve member 82 opens against the force of the spring 90. When this occurs, fluid from the reservoir 16 enters into the interior 88 of the filter element 52 through the plate opening 86 thus bypassing the filter element 52. However, even in a bypassing condition, the filter member 70 provides some filtering of the fluid.

With reference still to FIG. 1, the filter assembly 50 is inserted into the housing tube 40 through the opening 46 on the reservoir housing 18. When the filter assembly 50 is completely inserted into the tube, the bottom of the filter element 52 abuts against the housing flange 36. Simultaneously, the seal member 56 at the bottom of the filter element engages and fluidly seals the filter element flange 53 to the housing sleeve 30. The inwardly tapered portion 34 on the sleeve 30 facilitates the insertion of the flange member opening 54 over the housing sleeve 30.

With the filter assembly inserted into the housing tube 40 in the above described fashion, a portion of the holder member 58 protrudes above the fluid level 14 in the reservoir 16 and serves as a handle to enable the manual insertion and removal of the filter assembly 50 from the reservoir 16. In addition, if desired, the reservoir opening 46 can be closed by a cover 92 which is held in place by thumb screws 94.

Upon actuation of the pump 26, the fluid from the reservoir 16 passes through the perforated housing tube 40, the filter element 52 and into the interior chamber 88 of the filter element 52. From the chamber 88, the fluid passes through the housing passageway 28, the conduit 24 and to the pump 26 in the desired fashion.

During the operation of the pump 26, the filter element 52 becomes increasingly clogged with contaminants from the fluid. The pressure drop across the filter element 52 increases with the degree of clogging of the filter element 52. When the pressure drop across the filter element 52 exceeds a predetermined amount, the bypass valve means 82 opens to insure continued fluid flow through the filter device and yet still retain some filtering of the fluid. At this time, however, the filter element 52 should be either replaced or cleaned.

In order to replace and/or clean the filter element 52 the reservoir cover 92 is first removed and the entire filter assembly 50 is manually removed from the housing tube 40 and replaced with a different or a clean filter assembly 50. With the filter assembly 50 removed from the housing tube 40, no filtering of the fluid occurs.

Figure 3:
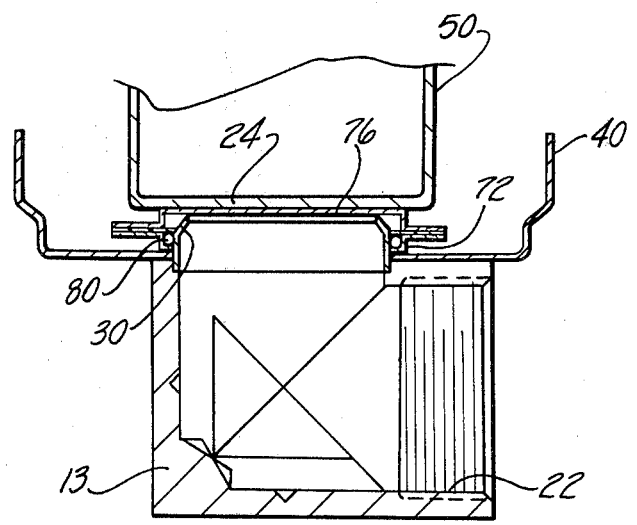
FIG. 3 is a fragmentary sectional view similar to FIG. 1 but showing the filtering device in a sealed non-operating condition.

With reference now to FIG. 3, if it becomes necessary to repair or replace the pump 26 or to service other components of the system downstream of the reservoir, the filter assembly 50 is removed from the housing tube 40 and inverted and reinserted into the housing tube 40. Upon doing so, the stopper 72 at the upper end of the holder member 58 is positioned around the housing sleeve 30 so that the stopper O-ring 80 fluidly seals the support 72 to the sleeve 30 and prevents fluid flow through the filter device. Once the pump 26 has been repaired or replaced or other service operations have been completed, the entire filter assembly 50 is again removed from the housing tube 40, inverted, and reinserted into the tube 40 and to the position shown in FIG. 1 whereupon the normal filtering operation of the filter device resumes.

From the foregoing, it can be seen that the present invention provides a simple, inexpensive and yet totally effective means for stopping the fluid flow through the filter device which eliminates the cost and complexity of the previously known shut-off valves. Although some nonfiltered fluid does enter the fluid system while the filter assembly 50 is physically removed from the housing tube 40, in practice, the amount of contaminants which enter the fluid system is negligible.

It will be understood, of course, that the stopper 72 can be constructed in any number of different forms or shapes provided, of course, that upon the inversion and reinsertion of the filter assembly 50 into the housing tube 40, the stopper 72 blocks the fluid flow through the housing passageway 28.

With reference to FIGS. 4-6, a further preferred embodiment of the invention is thereshown in which a pipe section 120 extends upwardly from the housing portion 13 and replaces the sleeve 30 in the first embodiment of the invention. In addition, the flange 53 at the lower end of the filter element 52 is conical in shape and extends toward the bypass valve means 82.

Referring to FIGS. 4 and 6, the stopper 72 is conical in shape and open at its wider or free end 122. The smaller diameter end 104 of the stopper 72 is closed by a circular plate 126 while a seal 128 is positioned within the stopper 72 adjacent the circular plate 126.

As can best be seen in FIG. 6, when the filter assembly 50 is inverted and inserted into the housing 12, the pipe section 120 is received within the open end 122 of the stopper 72 so that the seal 128 sealingly engages the pipe section 120. In doing so, the stopper 72 blocks fluid flow through the pipe section 120 in the desired fashion. In addition, the conical shape of both the flange 53 at the free end of the filter element 52 and the stopper 72 facilitates the insertion of the filter assembly 52 into both its filtering and its sealed positions.

Figure 7:
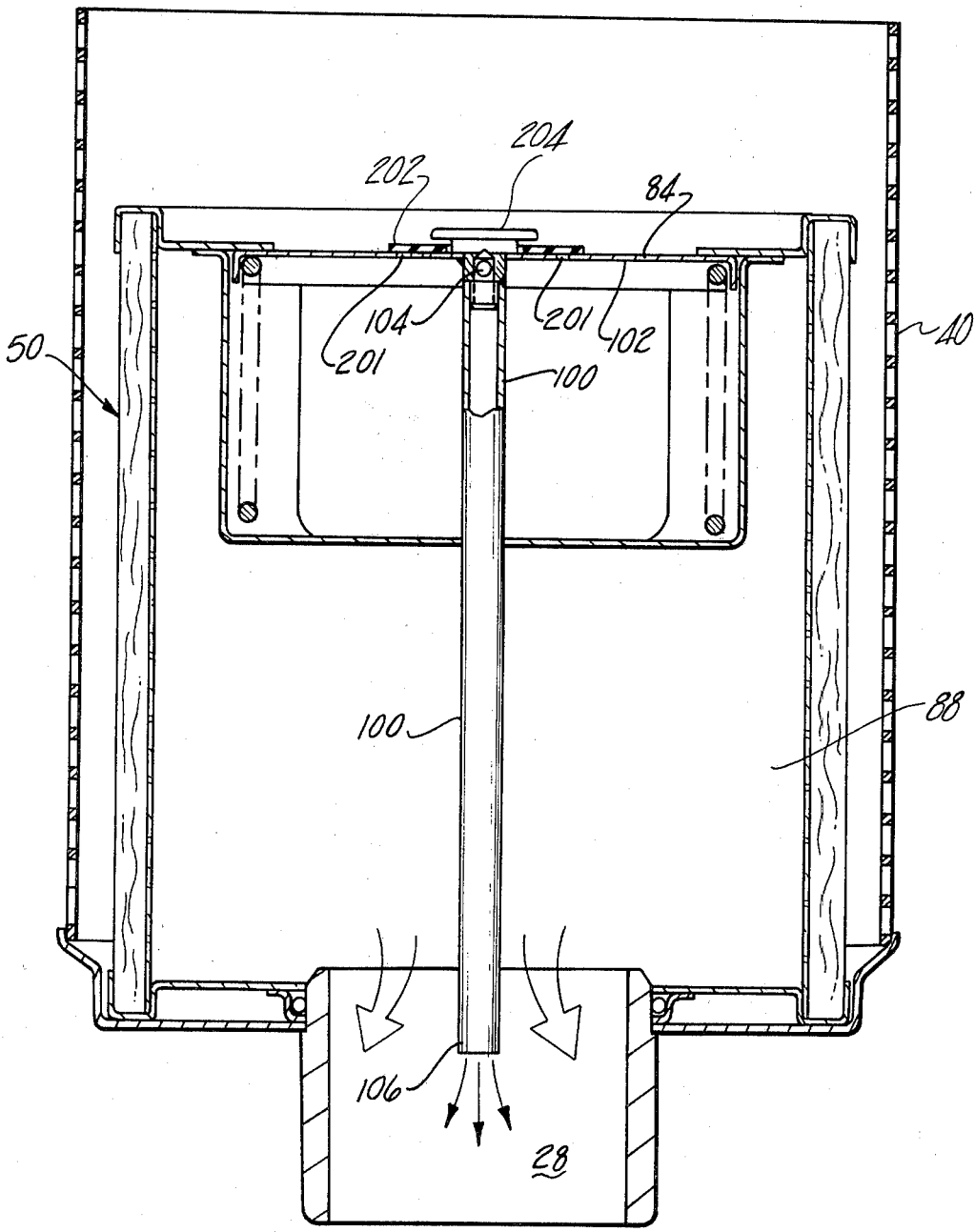
FIG. 7 is a fragmentary sectional view illustrating a modification of the device of the present invention.

With reference now to FIG. 7, a further improvement of the filtering device of the present invention is thereshown. In FIG. 7, a relatively small diameter air bleed tube 100 is attached to the inner side 102 of the bypass valve member 84 so that the tube 100 depends downwardly and generally coaxially with the filter assembly 50. A small opening 104 is formed at the upper end of the air bleed tube 100 while the lower end 106 of the air bleed tube 100 is positioned within the housing passageway 28.

The valve member 84 is provided with a plurality of spaced openings 201 manually covered by a resilient member 202. An enlarged portion 204 of the air bleed tube 100 limits upward movement of the resilient member 202.

During the operation of the filter device of the present invention, a certain amount of air entrained within the fluid passes through the filter element 52. When this entrained air separates from the fluid, it accumulates and forms an air pocket near the uppermost portion of the filter element chamber 88 and thus, underneath the bypass valve member 84. Due to the Venturi action of the fluid flowing through the fluid passage 28 at the lower end 106 of the air bleed tube 100, the air from this air pocket passes through the opening 104 in the bleed tube 100 and directly enters the effluent from the filter device. Since the operation of the air bleed tube 100 is continuous during the operation of the filter device, the air bleed tube 100 effectively prevents the accumulation of large air pockets in the effluent to the pump and fluid system.

It can, therefore, be seen that the air bleed tube 100 provides a simple, inexpensive and totally effective means for eliminating large air pockets in the effluent to the pump and fluid system.

In the modification illustrated in FIG. 7, installation of the filter assembly 50 into the tube 40 tends to trap air in chamber 88 beneath the filter assembly 50 which may be in such a volume that it cannot be extracted quickly enough by the opening 104 in the air bleed tube 100 to prevent a large amount of air being drawn into the pump 26.

This air will escape, however, through the holes 201, by lifting the resilient member 202, until the fluid pressure in chamber 88 is reduced to approximate the surrounding reservoir pressure. Subsequently, flow through opening 104 assumes the gas extraction process already described.

Having described by invention, however, many modifications thereto will become apparent to those skilled in the art to which it pertains without deviation from the spirit of the invention as defined by the scope of the appended claims.

I claim:

1. For use with a fluid system having a pump and a fluid reservoir at least partly filled with fluid to a fluid level, and a fluid filtering device comprising:
  a housing having at least a portion submerged within the reservoir, said housing having a fluid port connected with said pump,
  a filter assembly comprising a tubular filter element at one end and a holder assembly at its other end, said filter element being open at one end, and means for attaching the other end of the filter element to said holder assembly,
  said one end of the filter assembly being insertable into said reservoir so that said filter element engages said housing portion and so that one side of said filter element is in fluid communication with the fluid in the fluid reservoir,
  means for fluidly sealing said open end of said filter element to said housing portion,
  fluid passage means formed through said housing for fluidly connecting said port to the other side of the filter element, and
  closure means formed on the other end of said holder assembly, wherein said other end of said filter assembly is insertable into said reservoir and against said housing portion whereupon said closure means prevents fluid flow through said fluid passage means to thereby block fluid flow through said port.

2. The invention as defined in claim 1 and further comprising means for detachably securing said holder assembly to said filter element.

3. The invention as defined in claim 1 wherein said filter element is open at both ends, said filter assembly further comprising a filter member disposed across and covering the other end of the filter element, and normally closed bypass valve means having an inlet open to the filter member and an outlet open to the fluid port, said bypass valve means opening when the pressure drop across the filter element exceeds a predetermined amount.

4. The invention as defined in claim 1 wherein said fluid passage means comprises an upwardly facing opening and wherein said closure means further comprises a stopper which covers said opening when said other end of said filter assembly is inserted into said reservoir and against said housing.

5. The invention as defined in claim 1 wherein said housing further comprises a perforated tube secured to and extending upwardly from said submerged housing portion, and wherein at least a portion of said filter assembly is insertable into the interior of said tube.

6. The invention as defined in claim 1 wherein said fluid passage means comprises an opening to the interior of said filter element.

7. The invention as defined in claim 6 wherein said fluid port is an outlet port.

8. The invention as defined in claim 1 and further comprising an air bleed tube having an end open adjacent said other end of the filter element and its other end open in said fluid passage means.

9. The invention as defined in claim 6 and further comprising a tubular cylindrical sleeve attached to said housing portion coaxially around the fluid passage means opening so that said sleeve protrudes above the top of the housing portion and wherein said sealing means fluidly seals the open end of the filter element to said sleeve.

10. The invention as defined in claim 9 wherein the upper end of the sleeve includes an inwardly tapered portion.

11. The invention as defined in claim 1 and comprising an outwardly flared flange extending outwardly from said closure means.

12. The invention as defined in claim 11 wherein said flange is conical in shape.

* * * * *

UNITED STATES PATENT AND TRADEMARK OFFICE
CERTIFICATE OF CORRECTION

PATENT NO. : 4,387,022
DATED : June 19, 1981
INVENTOR(S) : Borje O. Rosaen

It is certified that error appears in the above—identified patent and that said Letters Patent is hereby corrected as shown below:

Column 6, Line 40 delete "by" insert --my--.

Signed and Sealed this

Twentieth Day of September 1983

[SEAL]

Attest:

GERALD J. MOSSINGHOFF

Attesting Officer    Commissioner of Patents and Trademarks